3,431,595
PRESSES FOR THE PRODUCTION OF CHIPBOARD

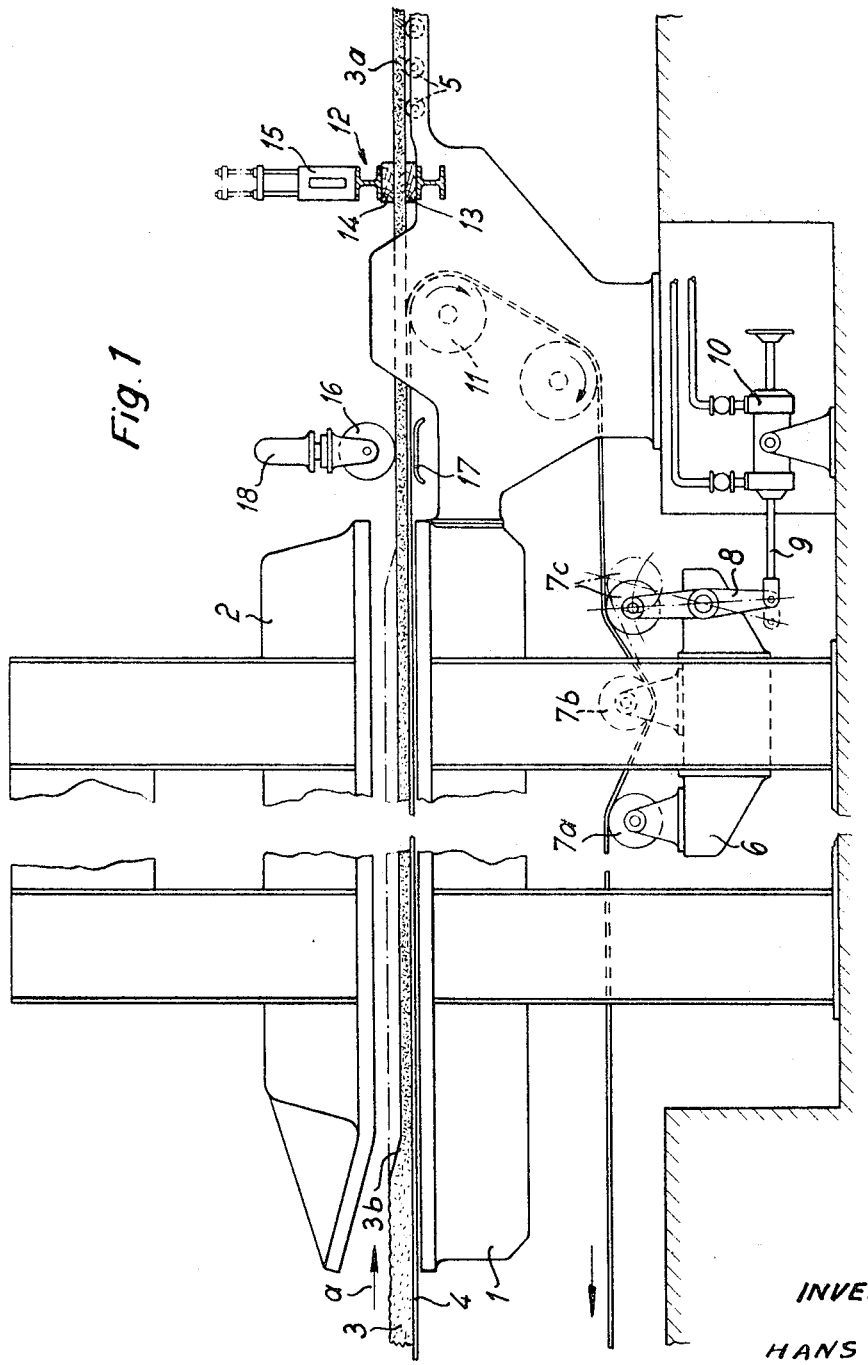

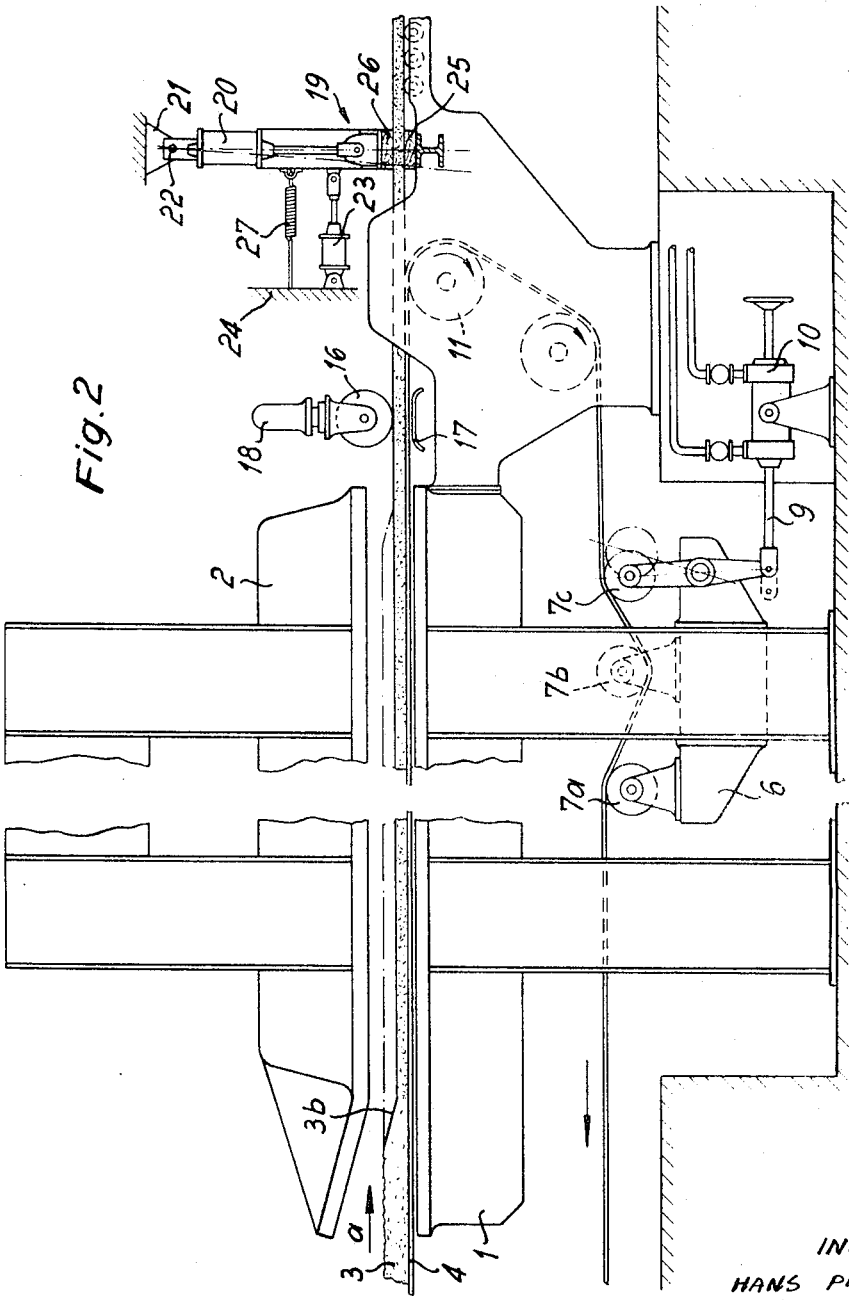

Hans Plum, Werner Feldges and Helmut Enger, Krefeld, Germany, and Hans Grefen, Waregem, Belgium, assignors to Niederrheinische Maschinenfabrik Becker & Van Hullen, Krefeld, Germany
Filed Mar. 23, 1966, Ser. No. 542,177
Claims priority, application Germany, Mar. 26, 1965, N 26,462
U.S. Cl. 18—4
Int. Cl. B29j 5/04

3 Claims

ABSTRACT OF THE DISCLOSURE

A press adapted for pressing and heating of a loose mat of material to form compact board. The press comprises a movable top press platen and a fixed lower press platen, a conveyor belt running over the lower press platen, means for pressing the board after it has left the conveyor, a loading device over which the finished board and conveyor slide, and a loading roller displaceable vertically above the board.

---

This invention relates to presses and more particularly to presses for the production of chipboard using an endless conveyor belt to introduce a mat batchwise between a vertically moving upper press platen and a lower platen to produce a continuous length of chipboard which is cut up as required beyond the press.

The endless conveyor belt is conventionally in the form of a so-called sieve belt or grid. Beyond the pressing platens it passes around a return roller, the board being sufficiently rigid to support itself as it moves beyond this point.

Both platens are heated to cause the mat to harden as it is pressed. Since the conveyor belt passes over the lower platen with the chip material it is also heated and expands thermally so that it is no longer taut. Since the belt interlocks somewhat with the board, when the belt is put in motion for conveying, the slackness is first taken up and this has a bad effect on quality since a tear or gap is produced between the pressed board and the unpressed chip mat.

There is also the further problem that when the conveyor belt is advanced it moves more slowly than the pressed board and this leads to stresses between the two.

One object of the invention is to make a device which removes the disadvantageous consequences due to expansion of the belt and causes the belt, board and unpressed mat to move substantially in step.

The present consists in a press adapted for the pressing and heating of a loose mat of material to form a compact board, comprising a moveable top press platen, a lower press platen, a conveyor belt running over the lower press platen for drawing the mat into the press in batches, a return roller for the belt, means for pressing the board after it has left the conveyor, and a tensioning device for the belt.

Preferably the belt tensioning device comprises three rollers arranged to cause the belt to follow a V-shaped course. One of the three rollers, for instance one of the two outer rolls of the tensioning device can be arranged to be moved by means of a lever on which it is carried. The lever can be operated by a hydraulic ram.

With this tensioning device the belt is automatically put under tension after it has been caused to expand by the heating and the press has been opened.

The means for pressing the board after it has left the conveyor serves to prevent a tear appearing in the transition zone between the board and unpressed mat. This pressing means preferably comprises a fixed beam below the board and a vertically moving second beam above the board. After the opening of the press the upper beam presses the board so that the latter cannot move in the direction of travel of the belt. Naturally the pressing means must be arranged beyond the belt return roller as otherwise the belt would also be ripped by the pressing means.

It has been found advantageous to construct the pressing means in such a manner that when it grips the board it tends to move it backwards since as the plate cools some shrinkage occurs. For this the pressing means can be arranged to slide or swing under the action of an adjustable pulling force acting in the direction opposite to the direction of travel of the belt. Preferably the backward force is adjustable. It can be produced by means of a spring while movement of the pressing means in the opposite direction can be caused by a hydraulic ram.

As already mentioned there is the problem of preventing the board moving ahead of the belt. One proposal for dealing with this was to place a roller above the return roller of the belt in order to brake the chipboard but this arrangement was found quite ineffective. We propose to provide a loading device comprising a support over which the finished board and the conveyor belt slide as they leave the press, and a loading roller for pressing the board down on to this support. Preferably the support and the loading roller above it extend across the whole width of the board. The support can be fixed in position while the roller moves up and down. The support can be inverted U-shape in cross-section.

The invention will now be described in more detail with reference to the attached diagrammatic drawings showing two embodiments of it. The embodiments differ principally in respect of the pressing means for acting on the board leaving the press. Like parts are denoted by like reference numerals.

FIG. 1 shows the first embodiment of the invention from the side.

FIG. 2 shows the second embodiment of the invention from the side.

The presses embodying the invention comprise in each case a lower press platen 1 and an upper press platen 2 preferably hydraulically operated. A mat of chips 3 is carried into the press by means of a conveyor belt 4 in the form of a sieve or grid which rests on the lower press platen 1 during pressing. A continuous length of board 3a issues from the right hand side of the press.

The pressing of the mat 3 is carried out, as is known, in batches and between each pressing operation the conveyor or belt 4 is moved in the direction a through a distance equal to the length of the platen 2. Beyond the platen 1 the board 3a runs over a roller conveyor 5 to a saw (not shown) cutting it up into suitable pieces.

Below the platen 1 there is a tensioning means 6 for adjusting the tension of the belt 4 when the pressing platen 2 is raised after a pressing operation. This is because the heating of the mat 3 by the press necessarily heats the belt 4 and causes it to expand in length so that its tension is reduced. If it were not for the tensioning means 6 the starting of the belt 4 would cause only the already formed board 3a to be moved and a tear or gap would be likely to occur between the unpressed mat 3 and the finished board 3a at the transition zone 3b.

The belt tensioning means 6 consists of three rollers 7a, 7b and 7c causing the belt 4 to follow a V-shaped course. Roller 7c is fixed on a lever 8 connected with a hydraulic ram 10 whose stroke can be adjusted. In accordance with the tension of the belt 4 to be obtained the roller 7c moves out of the position shown in broken lines into the one shown in full lines so as to remove the effect of thermal expansion on the tension.

In order to prevent the tensioning means 6 moving the board 3a as well as the belt 4, we provide, beyond the roller 11 of the belt, a pressing device 12 (FIG. 1) or a pressing device 19 (FIG. 2).

These pressing devices 12 and 19 serve to grip the board and prevent it being moved in the direction $a$.

The pressing device 12 consists of a transverse beam 13 fixed on a frame carrying platen 1 below the finished board 3a, and of a beam 14 which can be moved up and down by means of a ram 15.

The pressing means 19 is arranged so that it can move in the direction of the board (direction $a$). For this purpose the pressing ram 20 is suspended from a fixed support 21 by means of a pivot pin 21. A further ram 23, extending between the ram 20 and a fixed support 24, serves to move the ram 20 and a pressing beam 26 in the direction $a$ of travel of the board against the action of a tension spring 27. The latter also extends between the ram 20 and the support 24.

This construction not only prevents a movement of the board 3a in the direction $a$ when the belt is tensioned but also causes the board to be moved back by the suitably adjusted spring 27 to allow for shrinkage.

This can be further seen from the drawings, between the press platens and the roller 11 of the belt there is a loading means 16 comprising a support 17 of U-shaped cross section and a loading roller 16 above it. The support 17 is fixed while the roller 16 can be moved up and down by a ram 18.

This loading means ensures that the belt 4 and the finished board 3a move strictly in step when (after the tensioning of the belt has been carried out with the tensioning means 6) the belt 4 is used to convey the board.

The method of operation of the first press is as follows:

(1) Opening of the press.
(2) Lowering of beam 14 by ram 15 to grip board.
(3) Tensioning of conveyor belt by ram 10 swinging roller 7c.
(4) Release of pressure from ram 15 and release of beam 14.
(5) Lowering of loading roller 16.
(6) Conveying board by means of belt 4.

In the case of the embodiment of the invention shown in FIG. 2 the pressing means 19 is moved in the direction $a$ by the ram 23 and after the ram 20 is actuated the ram 23 is de-pressurized so that the spring 27 comes into operation.

Various modifications can be made in the embodiments of the invention shown, for instance the operation of the pressing means can occur simultaneously with the opening of the press or before it.

The embodiments of the invention in which a sole property or privilege is claimed are as follows:

1. A press adapted for the pressing and heating of a loose mat of material to form compact board, comprising in combination, a movable top press platen and a fixed lower press platen, a conveyor belt formed as a sieve running over the lower press platen for drawing the mat into the press in batches, a return roller for the belt, means for pressing the board after it has left the conveyor, tensioning means for the belt, said belt tensioning means comprising three rollers arranged to cause the belt to follow a V-shaped course, a lever on which one of said rollers is carried, a hydraulic ram for operating said lever, said board pressing means comprising a fixed beam below the board and a vertically moving second beam above the board, a loading device comprising a support of U-shaped cross-section over which the finished board and conveyor slide as they leave the press, and a loading roller extending across the whole width of the board for pressing the board down on said support, said loading roller being vertically displaceable.

2. A press in accordance with claim 1 in which the board pressing means is adapted to move in the direction of the band leaving the press, adjustable means being provided for opposing this movement.

3. A press in accordance with claim 2 in which the pressing means is provided with hydraulic ram means for moving it in the direction of movement of the band leaving the press platens, and with spring means for moving it in the opposite direction.

References Cited

UNITED STATES PATENTS

| | | |
|---|---|---|
| 986,162 | 3/1911 | Gare. |
| 2,182,168 | 12/1939 | Bierer. |
| 2,981,307 | 4/1961 | Malarkey. |
| 3,066,352 | 12/1962 | Ryberg. |
| 3,071,805 | 1/1963 | Merkle. |
| 3,099,042 | 7/1963 | Rabl. |
| 3,125,947 | 3/1964 | Hubin. |
| 3,157,914 | 11/1964 | Diebel et al. |
| 3,249,661 | 5/1966 | Willy. |
| 3,274,643 | 9/1966 | Oxel. |

FOREIGN PATENTS

| | | |
|---|---|---|
| 1,037,593 | 5/1953 | France. |
| 1,158,701 | 12/1963 | Germany. |

J. SPENCER OVERHOLSER, *Primary Examiner.*

J. HOWARD FLINT, *Assistant Examiner.*

U.S. Cl. X.R.

18—16, 17